United States Patent
Sato

(10) Patent No.: US 9,201,615 B2
(45) Date of Patent: Dec. 1, 2015

(54) IMAGE FORMING DEVICE AND METHOD FOR DISPLAYING IMAGE INFORMATION

(71) Applicant: KYOCERA Document Solutions Inc., Osaka-shi, Osaka (JP)

(72) Inventor: Masaoki Sato, Osaka (JP)

(73) Assignee: Kyocera Document Solutions Inc. (JP)

( * ) Notice: Subject to any disclaimer, the term of this patent is extended or adjusted under 35 U.S.C. 154(b) by 38 days.

(21) Appl. No.: 13/686,012

(22) Filed: Nov. 27, 2012

(65) Prior Publication Data

US 2013/0135680 A1    May 30, 2013

(30) Foreign Application Priority Data

Nov. 30, 2011  (JP) ................. 2011-261468

(51) Int. Cl.
*G06F 3/12*    (2006.01)
*H04N 1/00*    (2006.01)
*H04N 1/44*    (2006.01)

(52) U.S. Cl.
CPC ............... *G06F 3/12* (2013.01); *H04N 1/00278* (2013.01); *H04N 1/00456* (2013.01); *H04N 1/444* (2013.01); *G06F 3/1204* (2013.01); *G06F 3/128* (2013.01); *G06F 3/1222* (2013.01); *G06F 3/1256* (2013.01); *G06F 3/1271* (2013.01); *H04N 2201/0037* (2013.01); *H04N 2201/0041* (2013.01); *H04N 2201/0051* (2013.01); *H04N 2201/0087* (2013.01); *H04N 2201/3246* (2013.01)

(58) Field of Classification Search
CPC ......... G06F 3/12; G06F 3/128; G06F 3/1222; G06F 3/1271; G06F 3/1204; H04N 1/444; H04N 1/00278; H04N 1/00456; H04N 2201/0087; H04N 2201/0037; H04N 2201/0041; H04N 2201/0051; H04N 2201/3246
See application file for complete search history.

(56) References Cited

U.S. PATENT DOCUMENTS 6,650,430 B2 * 11/2003 Francis ................... G06F 21/34
                                                                    358/1.1
8,162,228 B2 *  4/2012 Yamamoto ............ G06F 21/608
                                                                    235/375

(Continued)

FOREIGN PATENT DOCUMENTS

JP         2007-188281         7/2007
JP         2007188281 A  *   7/2007

(Continued)

*Primary Examiner* — Ted Barnes
(74) *Attorney, Agent, or Firm* — Gerald E. Hespos; Michael J. Porco; Matthew T. Hespos

(57) ABSTRACT

A determination unit determines whether or not an image forming device is a pre-designated image forming device by using specifying information when security setting including the specifying information that specifies the pre-designated image forming device has been made in image data read from a portable external storage device. A display control unit causes a display unit to display image information specifying the image formed on the basis of the image data in a state in which security of the contents of the image is ensured when the image forming device is not determined by the determination unit to be the pre-designated image forming device, and causes the display unit to display the image information in a state in which security of the contents of the image is not ensured when the image forming device is determined by the determination unit to be the pre-designated image forming device.

5 Claims, 6 Drawing Sheets

(56) References Cited

U.S. PATENT DOCUMENTS

| | | | | |
|---|---|---|---|---|
| 8,542,387 B2* | 9/2013 | Mizuno | G06F 3/1204 | |
| | | | 358/1.13 | |
| 8,649,034 B2* | 2/2014 | Tsuzuki | H04N 1/0084 | |
| | | | 358/1.14 | |
| 8,856,866 B2* | 10/2014 | Choo | G06F 21/608 | |
| | | | 358/1.14 | |
| 2007/0206214 A1* | 9/2007 | Kano | G06F 3/1222 | |
| | | | 358/1.15 | |
| 2007/0206218 A1* | 9/2007 | Ohmori | G03G 15/5066 | |
| | | | 358/1.15 | |
| 2007/0294616 A1* | 12/2007 | Kizaki | H04N 1/00453 | |
| | | | 382/298 | |
| 2008/0055660 A1* | 3/2008 | Tsuzuki | H04N 1/0084 | |
| | | | 358/400 | |
| 2009/0002733 A1* | 1/2009 | Kakigi | G06F 3/1296 | |
| | | | 358/1.9 | |
| 2009/0046311 A1* | 2/2009 | Asai | G06F 21/608 | |
| | | | 358/1.9 | |
| 2010/0271666 A1* | 10/2010 | Kimura | G06F 21/608 | |
| | | | 358/3.26 | |
| 2010/0302572 A1* | 12/2010 | Suwabe | H04N 1/00209 | |
| | | | 358/1.13 | |
| 2011/0051163 A1* | 3/2011 | Roche | G06F 21/608 | |
| | | | 358/1.13 | |
| 2011/0181914 A1* | 7/2011 | Mizuno | G06F 3/1204 | |
| | | | 358/1.15 | |

FOREIGN PATENT DOCUMENTS

| | | |
|---|---|---|
| JP | 2009182746 | 8/2009 |
| JP | 2010224739 | 10/2010 |

\* cited by examiner

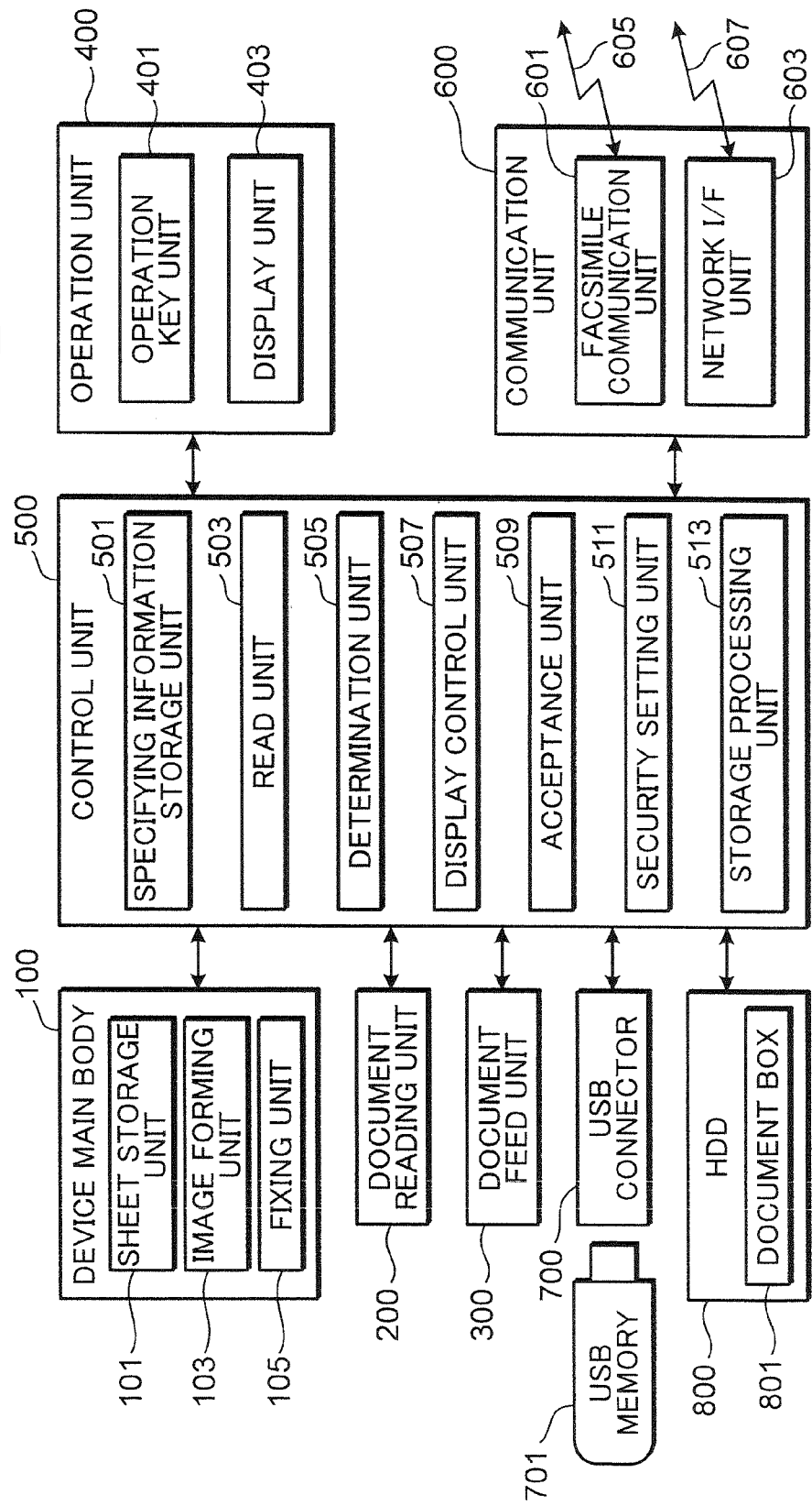

FIG.3

| | SECURITY SETTINGS | SPECIFYING INFORMATION |
|---|---|---|
| IMAGE DATA OF IMAGE A | NO | |
| IMAGE DATA OF IMAGE B | YES | IP ADDRESS OF FIRST IMAGE FORMING DEVICE, IP ADDRESS OF SECOND IMAGE FORMING DEVICE |
| IMAGE DATA OF IMAGE C | YES | IP ADDRESS OF SECOND IMAGE FORMING DEVICE |
| IMAGE DATA OF IMAGE D | YES | IP ADDRESS OF SECOND IMAGE FORMING DEVICE |
| IMAGE DATA OF IMAGE E | NO | |
| IMAGE DATA OF IMAGE F | NO | |
| IMAGE DATA OF IMAGE G | YES | IP ADDRESS OF FIRST IMAGE FORMING DEVICE, IP ADDRESS OF SECOND IMAGE FORMING DEVICE |

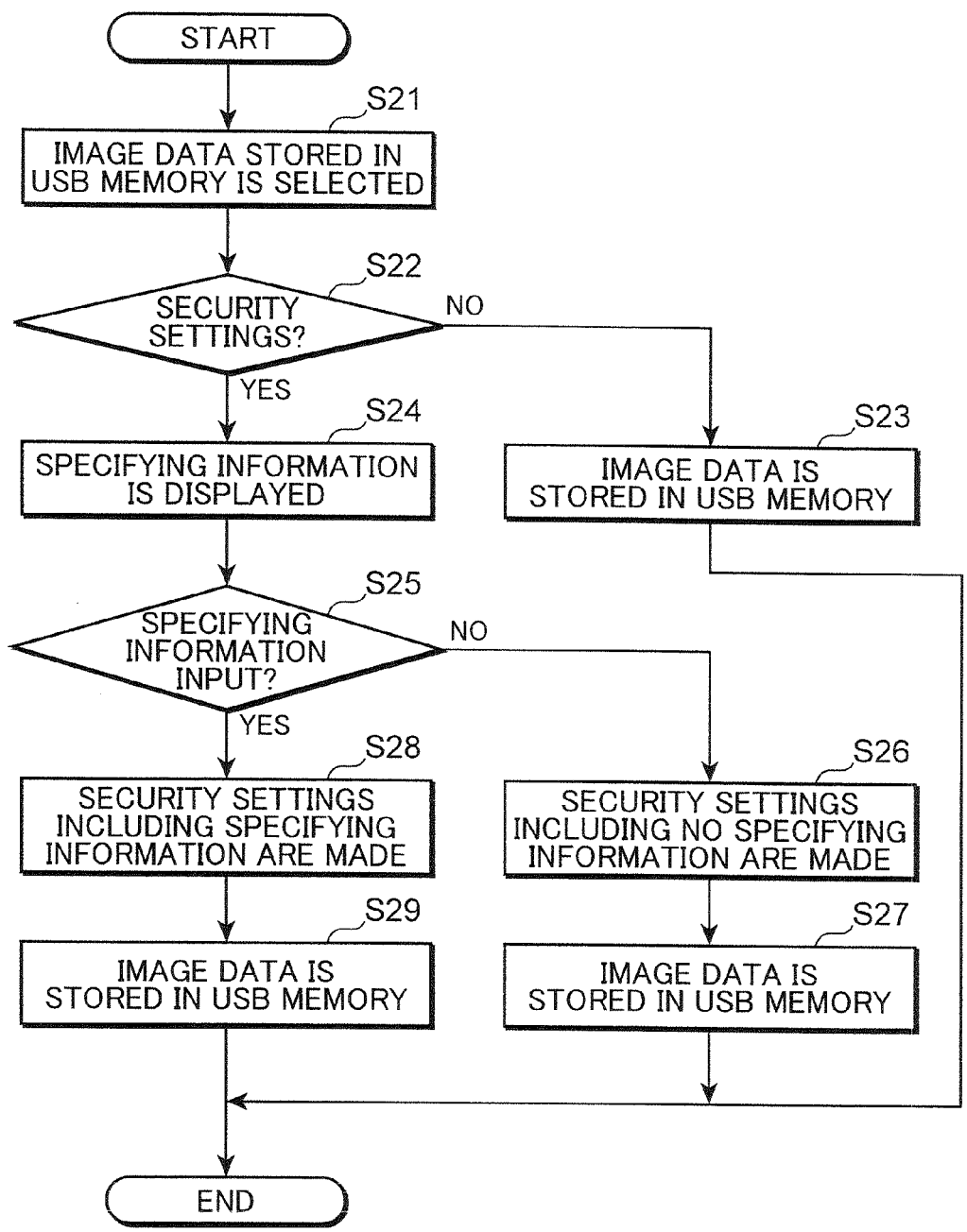

IMAGE FORMING DEVICE AND METHOD FOR DISPLAYING IMAGE INFORMATION

This application is based on Japanese Patent Application No. 2011-261468 filed on Nov. 30, 2011, and the contents thereof are incorporated herein by reference.

BACKGROUND

The present application relates to an image forming device that can read image data from a portable external storage device such as a universal serial bus (USB) memory and print the image, and also to a method for displaying image information that specifies the image.

A thumbnail is an example of image information specifying an image, and some of image forming devices such as all-in-one devices have a function of displaying a thumbnail in a state in which security of the contents of the image is ensured. A configuration in which a low-resolution thumbnail is displayed with respect to the image designated by a user has been suggested as an example of such image forming device. A configuration in which a thumbnail showing part of an image is displayed with respect to the image designated by a user has been suggested as another example of such image forming device.

A storage device such as a USB memory is an external storage device that can be carried by the user (portable external storage device). Therefore, it is possible to store data image in the portable external storage device, connect an unspecified image forming device to the portable external storage device, read the image data, and print the image. Under an environment in which an unspecified person can view a thumbnail (photo shop or the like), the user sometimes wishes that a thumbnail in a state in which security of the contents of the image is ensured be displayed on the display unit of the image forming device. Meanwhile, under an environment in which an unspecified person cannot view a thumbnail (e.g., at home), it is more convenient for the user that a thumbnail (usual thumbnail) in a state in which security of the contents of the image is not ensured be displayed on the display unit of the image forming device.

Where the settings for displaying a thumbnail in a state in which security of the contents of the image is ensured (security settings) are made, the security settings can be canceled by operating the operation unit of the image forming device. Since the operability of the operation unit of the image forming device is not as good as that of a personal computer, the cancelation of security settings is sometimes troublesome.

It is an object of the present disclosure to provide an image forming device and a method for displaying image information that can improve convenience for the user in the case where settings for displaying in a state in which security of the contents of the image is ensured are made with respect to image information specifying an image formed on the basis of image data stored in a portable external storage device.

SUMMARY

An image forming device according to one aspect of the present disclosure is an image forming device in which image data stored in a portable external storage device can be read and an image formed on the basis of the image data can be printed on a paper sheet, the image forming device including a connection unit, a read unit, a determination unit, a display unit, and a display control unit. The connection unit is connectable to the portable external storage device. The read unit reads the image data from the portable external storage device connected to the connection unit. The determination unit determines whether or not the image forming device is a pre-designated image forming device by using specifying information when security setting including the specifying information that specifies the pre-designated image forming device has been made in the image data read by the read unit. The display control unit causes the display unit to display image information specifying the image formed on the basis of the image data in a state in which security of the contents of the image is ensured when the image forming device is not determined by the determination unit to be the pre-designated image forming device, and causes the display unit to display the image information in a state in which security of the contents of the image is not ensured when the image forming device is determined by the determination unit to be the pre-designated image forming device.

A method for displaying image information according to another aspect of the present disclosure is a method for displaying image information specifying an image on a display unit of an image forming device in which image data stored in a portable external storage device can be read and an image formed on the basis of the image data can be printed on a paper sheet, the method including: a read step, a determination step, and a display control step. In the read step, the image data is read from the portable external storage device. In the determination step, it is determined whether or not the image forming device is a pre-designated image forming device by using specifying information when security setting including the specifying information that specifies the pre-designated image forming device has been made in the image data read in the read step. In the display control step, the display unit is caused to display image information specifying the image formed on the basis of the image data in a state in which security of the contents of the image is ensured when the image forming device is not determined in the determination step to be the pre-designated image forming device, and the display unit is caused to display the image information in a state in which security of the contents of the image is not ensured when the image forming device is determined in the determination step to be the pre-designated image forming device.

BRIEF DESCRIPTION OF THE DRAWINGS

FIG. 2 is a block diagram illustrating the configuration of the image forming device shown in FIG. 1;

FIG. 3 illustrates an example of image data stored in the USB memory in the present embodiment;

FIG. 7 is a flowchart illustrating the processing of storing image data in the USB memory by using the image forming device shown in FIG. 2.

DETAILED DESCRIPTION

Figure 1:
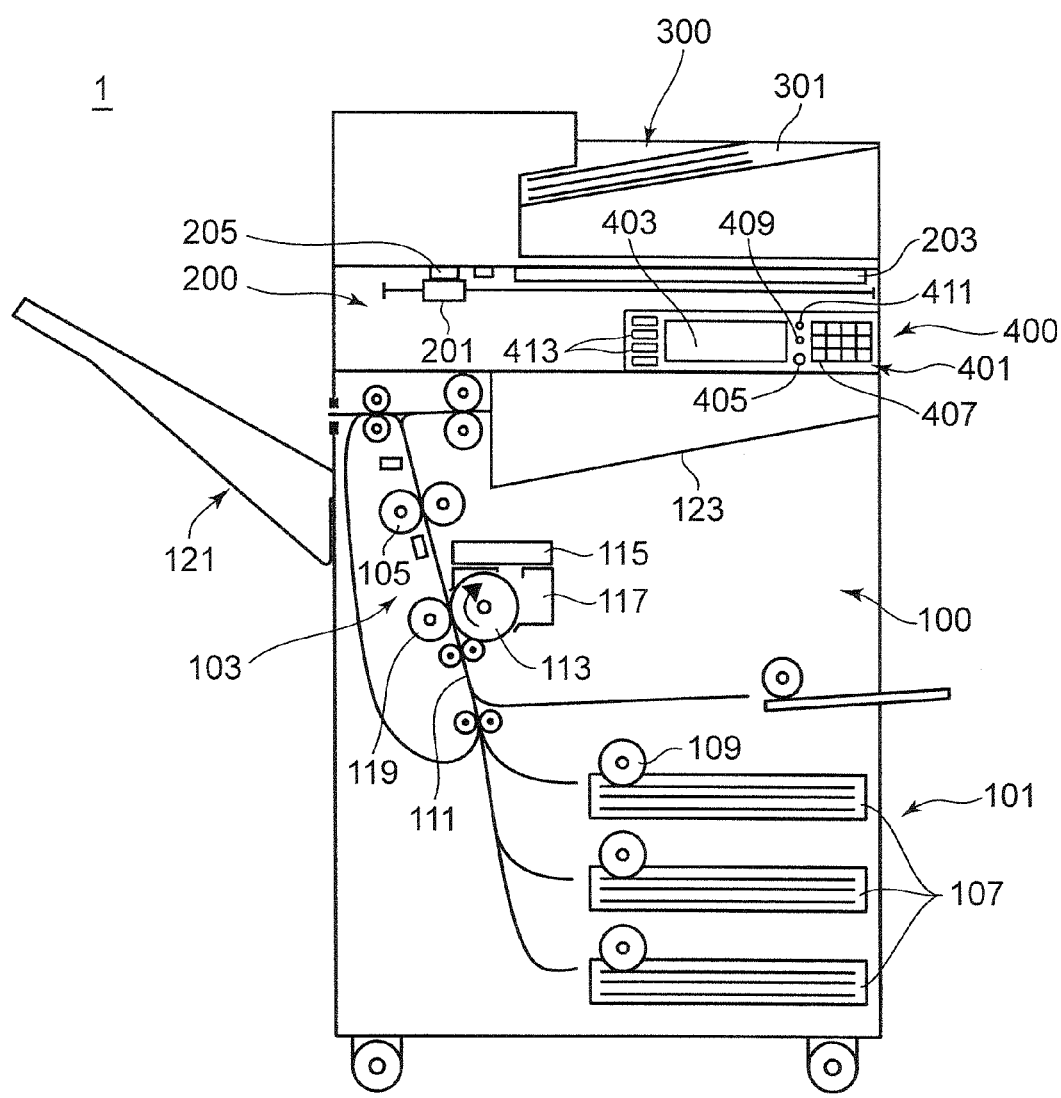
FIG. 1 illustrates schematically the internal structure of the image forming device according to an embodiment of the present disclosure.

An embodiment of the present disclosure will be described in detail hereinbelow with reference to the appended drawings. FIG. 1 illustrates schematically the internal structure of an image forming device 1 according to an embodiment of the present disclosure. The image forming device can be used, for example, in a digital all-in-one machine having the functions of a copier, a printer, a scanner, and a facsimile machine. The image forming device 1 is provided with a device main body 100, a document reading unit 200 disposed on the device main body 100, a document feed unit 300 disposed on the document reading unit 200, and an operation unit 400 disposed on the front surface in the upper portion of the device main body 100.

The document feed unit 300 functions as an automatic document feeder and can continuously feed a plurality of documents placed on a document placement unit 301 to the document reading unit 200.

The document reading unit 200 has a carriage 201 carrying an exposure lamp and the like, a document table 203 constituted by a transparent member such as glass, a charge coupled device (CCD) sensor (not shown in the figure), and a document reading slit 205. When the document placed on the document table 203 is read, the document is read by the CCD sensor, while the carriage 201 is being moved in the longitudinal direction of the document table 203. By contrast, when the document fed from the document feed unit 300 is read, the carriage 201 is moved to the position opposite the document reading slit 205, and the document fed from the document feed unit 300 is read by the CCD sensor through the document read slit 205. The CCD sensor outputs the read-out document as image data.

The device main body 100 is provided with a sheet storage unit 101, an image forming unit 103, and a fixing unit 105. The sheet storage unit 101 is disposed in the lowermost section of the device main body 100 and includes a sheet tray 107 capable of storing a stack of sheets. The uppermost sheet in the sheet stack stored in the sheet tray 107 is sent to the sheet conveying path 111 by the driver of a pick-up roller 109. The sheet is conveyed to the image forming unit 103 through the sheet conveying path 111.

The image forming unit 103 forms a toner image on the conveyed sheet. The image forming unit 103 is provided with a photosensitive drum 113, an exposure unit 115, a development unit 117, and a transfer unit 119. The exposure unit 115 generates light modulated according to image data (image data outputted from the document read unit 200, image data sent from a personal computer, image data of facsimile reception, and the like), and irradiates the circumferential surface of the photosensitive drum 113 that has been uniformly charged. As a result, an electrostatic latent image corresponding to the image data is formed on the circumferential surface of the photosensitive drum 113. In this state, a toner is supplied from the development unit 117 to the circumferential surface of the photosensitive drum 113, thereby forming a toner image corresponding to the image data on the circumferential surface. This toner image is transferred from the above-described sheet storage unit 101 to the sheet by the transfer unit 119.

The sheet with a toner image transferred thereto is sent to the fixing unit 105. In the fixing unit 105, heat and pressure are applied to the toner image and sheet, and the toner image is fixed to the sheet. The sheet is then discharged to a stack tray 121 or a discharge tray 123.

The operation unit 400 has an operation key unit 401 and a display unit 403. The display unit 403 has a touch panel function and displays a screen including soft keys. The user makes settings necessary for executing the function of a copier or the like by operating the soft keys, while looking at the screen.

The operation key unit 401 is provided with operation keys constituted by hard keys. More specifically, the operation key unit is provided with a start key 405, ten keys 407, a stop key 409, a reset key 411, and a function switching key 413 for switching the functions of the copier, printer, scanner, and facsimile machine.

The start key 405 starts the operation of the copier, facsimile transmission, and the like. The ten keys 407 serve to input the numbers such as the number of copies and the facsimile number. The stop key 409 can interrupt the copying operation. The reset key 411 returns the set contents to the initial setting state.

The function switching key 413 is provided with a copy key and a transmission key and serves to switch between the copy function and transmission function. Where the copy key is operated, an initial screen of copying is displayed on the display unit 403. Where the transmission key is operated, the initial screens of facsimile transmission and mail transmission are displayed on the display unit 403.

FIG. 2 is a block diagram illustrating the configuration of the image forming device 1 showman FIG. 1. The image forming device 1 has a configuration in which the device main body 100, the document reading unit 200, the document feed unit 300, the operation unit 400, a control unit 500, a communication unit 600, a USB connector 700, and a hard disk drive (HDD) 800 are connected with each other by a bus. The device main body 100, document reading unit 200, document feed unit 300, and operation unit 400 have already been explained above, and the explanation thereof is herein omitted.

The communication unit 600 is provided with a facsimile communication unit 601 and a network I/F unit 603. The facsimile communication unit 601 is provided with a network control unit (NCU) that controls the connection of a telephone line to a destination facsimile machine and a modem circuit that performs modulation and demodulation of signals for facsimile communication. The facsimile communication unit 601 is connected to a telephone line 605.

The network I/F unit 603 is connected to a local area network (LAN) 607. The network I/F unit 603 is a communication interface circuit for executing communication with a terminal device such as a personal computer connected to the LAN 607.

The USB connector 700 functions as a connection unit that can be connected to a USB memory 701. The USB connector 700 is mounted on the case of the device main unit 100. The USB connector 700 is an example of a connection unit that can be connected to a portable external memory device. Examples of the portable external memory device, other than the USB memory, include a compact disk (CD), a SD memory, and an external HDD.

The HDD 800 is an example of an image data storage unit and installed in the image forming device 1. The HDD 800 is used for saving image data outputted from the document reading unit 200, image data transmitted from the personal computer via the communication unit 700, image data that have been facsimile received via the communication unit 700, and the like. Part of the storage area of the HDD 800 is used as a document box 801. The abovementioned image data can be stored in the document box 801.

The control unit 500 is provided with a central processing unit (CPU), a read only memory (ROM), a random access memory (RAM), and an image memory. The CPU executes the control necessary for operating the image forming device 1 with respect to the abovementioned constituent elements of the image forming device 1, such as the device main body 100. The ROM stores the software necessary for controlling the operation of the image forming device 1. The RAM is used for temporary storing the data generated when the software is executed and for storing application software. The image memory temporarily stores image data (image data outputted from the document reading unit 200, image data sent from the personal computer, image data received by the facsimile machine, and the like).

The control unit 500 is provided with a specifying information storage unit 501, a read unit 503, a determination unit 505, a display control unit 507, an acceptance unit 509, a security setting unit 511, and a storage processing unit 513 as functional blocks.

The specifying information storage unit 501 stores in advance a plurality of specifying information that have been allocated to a plurality of image forming devices that serve as candidates of the pre-designated image forming device. The read unit 503 reads image data from the USB memory 701 connected to the USB connector 700. The determination unit 505 determines whether or not the image forming device 1 is the pre-designated image forming device when security settings including specifying information specifying the pre-designated image forming device have been made in the image data read by the read unit 503.

The display control unit 507 displays on the display unit 403 a thumbnail in a state in which security of the contents of the image is ensured when the image forming device 1 is not determined by the determination unit 505 to be the pre-designated image forming device. Further, the display control unit 507 displays on the display unit 403 a thumbnail in a state in which security of the contents of the image is not ensured when the image forming device 1 is determined by the determination unit 505 to be the pre-designated image forming device. Furthermore, the display control unit 507 displays on the display unit 403 a plurality of specifying information that has been stored in the specifying information storage unit 501 when the image data stored in the HDD 800 is stored in the USB memory 701 while the security settings are made in the image data.

The acceptance unit 509 accepts, in response to the operation unit 400 being operated, the input of specifying information when the image data stored in the HDD 800 is stored in the USB memory 701 while the security settings are made in the image data. Further, the acceptance unit 509 accepts, in response to the operation unit 400 being operated, an input that selects specifying information of one or two or more types from among a plurality of specifying information displayed on the display unit 403. In addition, the acceptance unit 509 accepts, in response to the operation unit 400 being operated, an image printing command specified by image information displayed on the display unit 403.

The security setting unit 511 makes securing settings including specifying information accepted by the acceptance unit 509 with respect to the image data stored in the HDD 800. The storage unit 513 causes the USB memory 701 to store the image data for which the security settings have been made in the security setting unit 511.

FIG. 3 illustrates an example of image data stored in the USB memory 701 in the present embodiment. The image data of images A to G is stored in the USB memory 701. The image data is stored in association with specifying information and whether or not the security settings are present. The first image forming device and second image forming device are examples of the pre-designated image forming device.

The security settings as referred to herein as settings that cause the display of a thumbnail in a state in which security of the contents of the image is ensured.

The pre-designated image forming device is an image forming device in which the security settings are automatically canceled and the thumbnail in a state in which security of the contents of the image is not ensured is displayed on the display unit 403 even when the security settings have been made in the image data stored in the USB memory 701.

A thumbnail is an example of image information. The image information as referred to herein is information specifying an image that is formed on the basis of image data. A character image showing bibliographic matters such as a file name, an update date, and data size of image data also corresponds to image information.

The specifying information as referred to herein is information specifying the pre-designed image forming device. In the present embodiment, Internet protocol (IP) addresses allocated to a plurality of image forming devices including the image forming device 1 are taken as the specifying information.

The thumbnail in a state in which security of the contents of the image is ensured is described below. Thus, the thumbnail is processed such that by looking at the thumbnail a person performing the operation of storing image data of the image in the USB memory 701 can understand the type of image, whereas another person cannot understand it. For example, this is a thumbnail that shows only part of the image or a thumbnail in which the resolution is decreased to a degree such that another person cannot understand the image contents.

By contrast, the thumbnail in a state in which security of the contents of the image is not ensured is a thumbnail processed such that by looking at the thumbnail a person performing the operation of storing image data of the image in the USB memory 701 and another person can understand the type of image. Thus, an image (the usual thumbnail) reduced in size with a resolution such that the other person can understand the image contents corresponds to such a thumbnail.

Security settings have not been made for image data of image A, image E, and image F. Therefore, with respect to image A, image E, and image F, a thumbnail in a state in which security of the contents of the images is not ensured is displayed, without inquiring whether or not the image forming device 1 is a pre-designated image forming device.

By contrast, security settings have been made for image data of image B, image C, image D, and image G. In the image data of image B and image G, the specifying information is an IP address of the first image forming device and the IP address of the second image forming device. Therefore, where the image forming device 1 is the first image forming device or the second image forming device, thumbnails displayed with respect to image B and image G are those in a state in which security of the images is not ensured. By contrast, where the image forming device 1 is an image forming device other than the first image forming device or the second image forming device, thumbnails displayed with respect to image B and image G are those in a state in which security of those images is ensured.

In image data of image C and image D, the specifying information is the IP address of the second image forming device. Therefore, where the image forming device 1 is the second image forming device, thumbnails displayed with respect to image C and image D are those in a state in which security of the contents of the images is not ensured. Meanwhile, where the image forming device 1 other than the second image forming device, thumbnails displayed with respect to image C and image D are those in a state in which security of the contents of the images is ensured.

Figure 4:
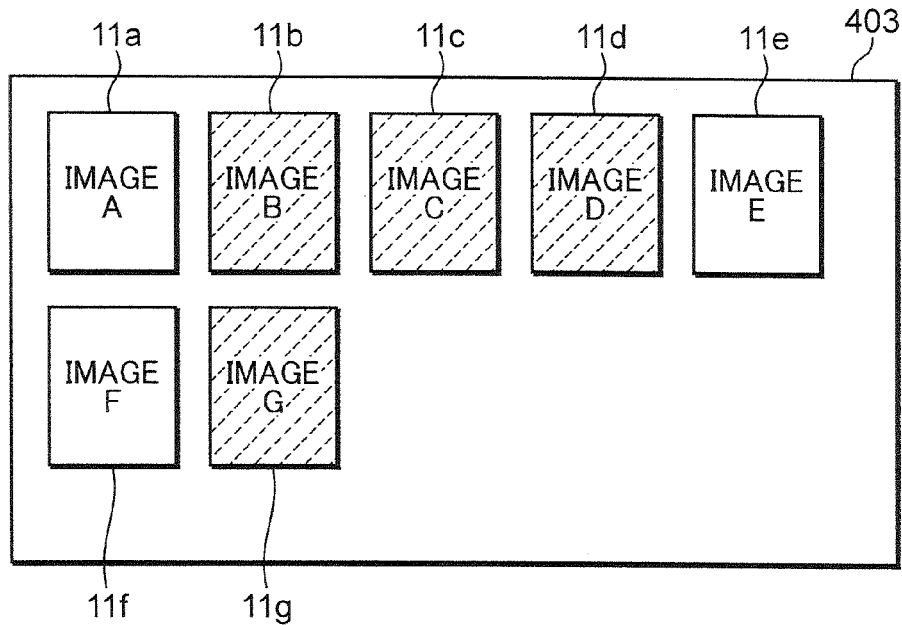
FIG. 4 illustrates an example of thumbnails displayed on the display unit when the image forming device shown in FIG. 2 is not a pre-designated image forming device.

FIG. 4 illustrates an example of thumbnails 11a to 11g displayed on the display unit 403 when the image forming device 1 is not the pre-designated image forming device. Since the security settings have been made for image data of image B, image C, image D, and image G, the thumbnails 11b, 11c, 11d, and 11g of a state in which security of the contents of the image is ensured are displayed with respect to those images. Since no security settings have been made with respect to image data of image A, image E, and image F, thumbnails 11a, 11e, and 11f in a state in which security of the contents of the image is not ensured are displayed with respect to those images.

Figure 5:
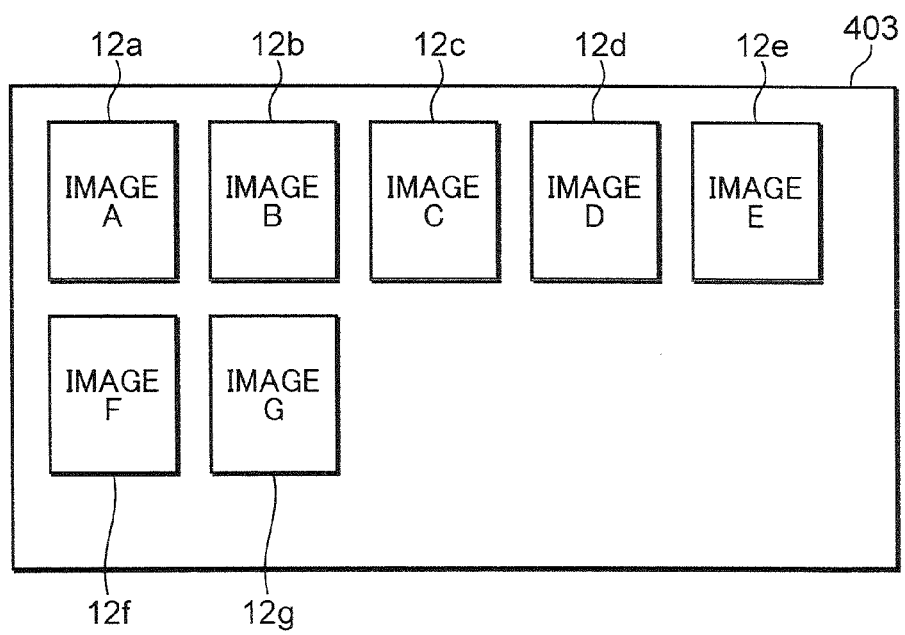
FIG. 5 illustrates an example of thumbnails displayed on the display unit when the image forming device shown in FIG. 2 is a pre-designated image forming device.

FIG. 5 illustrates an example of thumbnails 12a to 12g displayed on the display unit 403 when the image forming device 1 is a pre-designated image forming device (in this case, the second image forming device). The security settings have been made for image data of image B, image C, image D, and image G, but the settings are canceled. Therefore, thumbnails 12b, 12c, 12d, and 12g in a state in which security of the contents of the image is not ensured are displayed with respect to those images. Since no security settings have been made for image data of image A, image E, and image F, thumbnails 12a, 12e, and 12f in a state in which security of the contents of the image is not ensured are displayed with respect to those images.

When the image forming device 1 is the first image forming device (example of the pre-designated image forming device), the security settings are not canceled with respect to image C and image D, and thumbnails in a state in which security of the contents of the image is ensured are displayed with respect to those images. Meanwhile, the security settings are canceled with respect to image B and image G, and thumbnails in a state in which security of the contents of the image is not ensured are displayed with respect to those images.

Figure 6:
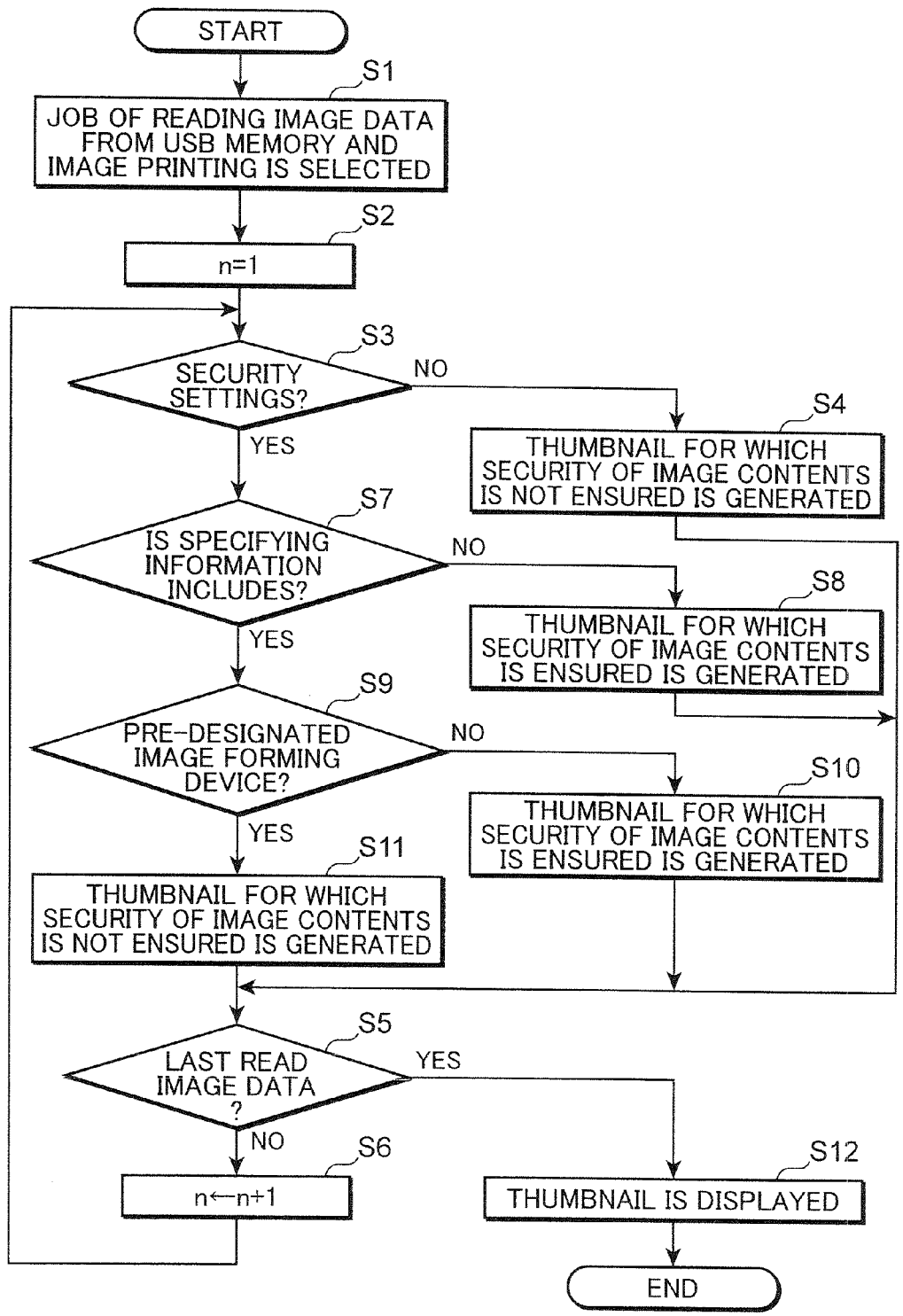
FIG. 6 is a flowchart illustrating the processing of displaying the thumbnail of an image to be formed on the basis of image data stored in the USB memory.

The processing of displaying a thumbnail of the image formed on the basis of the image data stored in the USB memory 701 will be explained below. FIG. 6 is a flowchart illustrating this processing.

A job of reading the image data from the USB memory 701 and printing the image is selected in response to the operation unit 400 being operated in a state in which the USB memory 701 is connected to the USB connector 700 (step S1). As a result, the read unit 503 reads all of the image data stored in the USB memory 701.

The determination unit 505 determines the number of image data read from the USB memory 701 and sets n=1 (step S2). The n=1 setting designates the image data read in the first cycle. The determination unit 505 determines whether or not security settings have been made in the image data read in the first cycle (step S3).

When the determination unit 505 does not determine that security settings have been made in the image data read in the first cycle (step S3: No), the display control unit 507 uses the image data read in the first cycle to generate a thumbnail in a state in which security of the contents of the image is not ensured (step S4).

The determination unit 505 determines whether the image data read in the first cycle is the last read data (step S5). Where the determination unit 505 does not determine that the image data read in the first cycle is the last read data (step S5: No), the determination unit 505 sets N+1 to n (step S6), and the processing advances to step S3. Therefore, the processing of step S3 and subsequent steps is also performed with respect to the image data read in the second and subsequent cycles.

Meanwhile, where the determination unit 505 determines that security settings have been made in the image data read in the first cycle (step S3: Yes), the determination unit 505 determines whether or not specifying information is included in the security settings (step S7).

Where the determination unit 505 does not determine that specifying information is included in the security settings (step S7: No), the display control unit 507 generates a thumbnail in a state in which security of the contents of the image is ensured with respect to the image data read in the first cycle (step S8). The processing then advances to step S5.

Where the determination unit 505 determines that specifying information is included in the security settings with respect to the image data read in the first cycle (step S7: Yes), the determination unit 505 determines whether or not the image forming device 1 is the pre-designated image forming device by using this specifying information (step S9). More specifically, it is determined whether or not the IP address, which is the specifying information, is the IP address allocated to the image forming device 1.

Where the determination unit 505 does not determine that the image forming device 1 is the pre-designated image forming device (step S9: No), the display control unit 507 generates a thumbnail in a state in which security of the contents of the image is ensured with respect to the image data read in the first cycle (step S10). This processing is similar to that of step S8. The processing then advances to step S5.

Where the determination unit 505 determines that the image forming device 1 is the pre-designated image forming device (step S9: Yes), the display control unit 507 generates a thumbnail in a state in which security of the contents of the image is not ensured by using the image data read in the first cycle (step S11). This processing is similar to that of step S4. The processing then advances to step S5.

Where the determination unit 505 determines that the image data read in the n-th cycle is the last read image data (step S5: Yes), the display control unit 507 displays on the display unit 403 the thumbnails generated in step S4, step S8, step S10, and step S11.

FIG. 4 shows an example of thumbnails 11a to 11g displayed on the display unit 403 when the image forming device 1 is not the pre-designated image forming device. FIG. 5 shows an example of thumbnails 12a to 12g displayed on the display unit 403 when the image forming device 1 is the pre-designated image forming device (in this case, the second image forming device).

The processing of storing the image data in the USB memory 701 by using the image forming device 1 will be explained below. FIG. 7 is a flowchart illustrating this process.

A plurality of image data is stored in the HDD 800 (FIG. 2) incorporated in the image forming device 1. Image data stored in the USB memory 701 is selected from among the plurality of image data stored in the HDD 800 by operating the operation unit 400 in a state in which the USB memory 701 is connected to the USB connector 700 (step S21).

The control unit 500 determines whether or not security settings have been selected in response to the operation unit 400 being operated (step S22). Where the control unit 500 does not determine that security setting have been selected (step S22: No), the storage processing unit 513 causes the USB memory 701 to store the image data selected in step S21 (step S23). In this case, a thumbnail in a state in which security of the contents of the image is not ensured is displayed on the display unit 403 when a job of reading the image data from the USB memory 701 and printing the image is performed using the image forming device 1 or another image forming device.

When the control unit 500 determines that security settings have been selected (step S22: Yes), the display control unit 507 reads specifying information stored in the specifying information storage unit 501 and causes the display unit 403 to display this information (step S24). The specifying information as referred to herein is, for example, the IP address of the image forming device 1, the IP address of the first image forming device shown in FIG. 3, and the IP address of the second image forming device.

The acceptance unit 509 determines whether or not one or two or more specifying information, from among a plurality of specifying information displayed on the display unit 403, have been inputted by operating the operation unit 400 (step S25).

Where the acceptance unit 509 does not determine that the specifying information has been inputted (step S25: No), the security setting unit 511 makes security settings including no specifying information with respect to the image data selected in step S21 (step S26). The storage processing unit 513 performs the processing of causing the USB memory 701 to store the image data (step S27). In this case, a thumbnail in a state in which security of the contents of the image is ensured is displayed on the display unit 403 when a job of reading the image data from the USB memory 701 and printing the image is performed using the image forming device 1 or another image forming device.

Where the acceptance unit 509 determines that the specifying information has been inputted (step S25: Yes), the security setting unit 511 makes security settings including the specifying information with respect to the image data selected in step S21 (step S28). The storage processing unit 513 performs the processing of causing the USB memory 701 to store the image data (step S29). In this case, the thumbnails differ according to the image forming device when a job of reading the image data from the USB memory 701 and printing the image is performed using the image forming device 1 or another image forming device. Thus, in the case of an image forming device specified by the specifying information (that is, the pre-designated image forming device), a thumbnail in a state in which security of the contents of the image is not ensured is displayed on the display unit 403. By contrast, where an image forming device is not specified by the specifying information (that is, not the pre-designated image forming device), a thumbnail in a state in which security of the contents of the image is ensured is displayed on the display unit 403.

The main effects of the present embodiment are explained below. In the present embodiment, security settings including specifying information that specifies the pre-designated image forming device can be made in the image data stored in the USB memory 701. Whether or not the image forming device 1 connected to the USB memory 701 is the pre-designated image forming device is determined using this specifying information. Where the image forming device 1 is not determined to be the pre-designated image forming device, a thumbnail in a state in which security of the contents of the image is ensured is displayed on the display unit 403 of the image forming device 1. Meanwhile, where the image forming device 1 is determined to be the pre-designated image forming device, a thumbnail in a state in which security of the contents of the image is not ensured is displayed on the display unit 403 of the image forming device 1.

Therefore, with the present embodiment, whether or not to cancel automatically the security settings (that is, settings causing the display of a thumbnail in a state in which security of the contents of the image is ensured), can be selected by the user in advance according to the image forming device.

Therefore, in the image forming device pre-designated by the user, the operation of canceling the security settings by operating the operation unit of the image forming device can be made unnecessary. Therefore, the convenience for the user can be increased in the case where security settings have been made with respect to the thumbnail (image information) of the image formed on the basis of image data stored in the portable external storage device such as a USB memory.

Further, with the present embodiment, as explained in steps S21 to S29 shown in FIG. 7, the processing of making the security settings including the specifying information with respect to the image data stored in the HDD 800 and storing the image data in the USB memory 701 can be executed by using the image forming device 1, without using a personal computer.

Furthermore, with the present embodiment, as explained in step S24 shown in FIG. 7, when there is a plurality of image forming devices as the candidates for the pre-designated image forming device, the specifying information of those image forming devices (IP addresses) is stored in advance, and the user can select the specifying information of one or two or more types from among the plurality of the specifying information. As a result, it is possible to save the user the trouble of inputting one or two or more specifying information by operating ten keys of the operation unit 400.

Further, in the present embodiment, with respect to a thumbnail in a state in which security of the contents of the image is not ensured, the image specified by the thumbnail is allowed to be printed. However, with respect to a thumbnail in a state in which security of the contents of the image is ensured, printing of the image specified by the thumbnail is prohibited, thereby ensuring security of the image.

Thus, the image forming unit 103 shown in FIG. 2 executes a printing command and prints the image on a paper sheet when (a) the printing command accepted by the acceptance unit 509 is a printing command for the image specified by the thumbnail displayed on the display unit 403 in a state in which security of the contents of the image is not ensured. The image forming unit 103 does not execute a printing command when (b) the printing command accepted by the acceptance unit 509 is a printing command for the image specified by the thumbnail displayed on the display unit 403 in a state in which security of the contents of the image is ensured.

What is claimed is:

1. An image forming device in which image data stored in a portable external storage device can be read and an image formed on the basis of the image data can be printed on a paper sheet, the image forming device comprising a connection unit connectable to the portable external storage device, the portable external storage device stores each of the image data in association with specifying information and whether or not a security setting is present, the specifying information specifying a pre-designated image forming device, the security setting being a setting that causes display of a thumbnail in a state in which security of the contents of the image is ensured;

a read unit that reads each of the image data from the portable external storage device connected to the connection unit;

a determination unit that:
determines whether or not the security setting has been made in each of the image data read by the read unit,
determines whether or not the specifying information has been included when the determination unit determines that the security setting has been made, and determines whether or not the image forming device is the pre-designated image forming device by using the specifying information when the determination unit determines that the specifying information has been included;

a display unit;

a display control unit that:

causes the display unit to display a thumbnail specifying the image formed on the basis of the image data in a state in which security of the contents of the image is not ensured when the determination unit determines that the security setting has not been made, causes the display unit to display the thumbnail in a state in which security of the contents of the image is ensured when the determination unit determines that the security setting has been made and specifying information has not been included, causes the display unit to display the thumbnail in a state in which security of the contents of the image is ensured when the determination unit determines that the security setting has been made, the specifying information has been included and the image forming device is not the pre-designated image forming device, and causes the display unit to display the thumbnail in a state in which security of the contents of the image is not ensured when the determination unit determines that the security setting has been made, the specifying information has been included and that the image forming device is the pre-designated image forming device;

an operation unit;

an acceptance unit that accepts, in response to the operation unit being operated, a printing command for the image specified by the thumbnail displayed on the display unit; and an image forming unit that (a) executes a printing command and prints the image on the sheet when the printing command accepted by the acceptance unit is the printing command of the image specified by the thumbnail displayed on the display unit in a state in which security of the contents of the image is not ensured, and (b) does not execute the printing command when the printing command accepted by the acceptance unit is the printing command of the image specified by the thumbnail displayed on the display unit in a state in which security of the contents of the image is ensured.

2. The image forming device according to claim 1, comprising:

an image data storage unit where image data are stored;

a second acceptance unit that accepts, in response to the operation unit being operated, an input of the specifying information when image data stored in the image data storage unit is stored in the portable external storage device while the security setting is made in the image data;

a security setting unit that makes the security setting including the specifying information accepted by the second acceptance unit with respect to image data stored in the image data storage unit; and storage processing unit that causes the portable external storage device to store the image data for which the security setting has been made in the security setting unit.

3. The image forming device according to claim 2, comprising a specifying information storage unit that stores in advance a plurality of the specifying information allocated to a plurality of image forming devices serving as candidates for the pre-designated image forming device, wherein the display control unit displays the plurality of the specifying information on the display unit when image data stored in the image data storage unit is stored in the portable external storage device while the security setting is made in the image data; and the second acceptance unit accepts an input information in which the specifying information of one, or two or more types is selected from among the plurality of the specifying information displayed on the display unit by operating the operation unit.

4. The image forming device according to claim 1, wherein the specifying information is an IP address allocated to the pre-designated image forming device specified by the specifying information.

5. A method for displaying image information specifying an image on a display unit of an image forming device in which image data stored in a portable external storage device can be read and an image formed on the basis of the image data can be printed on a paper sheet, the method comprising:

a read step of reading each of the image data from the portable external storage device, the portable external storage device stores each of the image data in association with specifying information and whether or not a security setting is present, the specifying information specifying a pre-designated image forming device, the security setting being a setting that causes display of a thumbnail in a state in which security of the contents of the image is ensured;

a determination step of:

determining whether or not the security setting has been made in each of the image data read by the read step, determining whether or not the specifying information has been included when the determination step determines that the security setting has been made, and determining whether or not the image forming device is the pre-designated image forming device by using the specifying information when the determination step determines that the specifying information has been included;

a display control step of:

causing the display unit to display a thumbnail specifying the image formed on the basis of the image data in a state in which security of the contents of the image is not ensured when the determination step determines that the security setting has not been made, causing the display unit to display the thumbnail in a state in which security of the contents of the image is insured when the determination step determines that the security setting has been made and the specifying information has not been included, causing the display unit to display the thumbnail in a state in which security of the contents of the image is ensured when the determination step determines that the security setting has been made, the specifying information has been included and that the image forming device is not the pre-designated image forming device, and causing the display unit to display the thumbnail in a state in which security of the contents of the image is not ensured when the determination step determines that the security setting has been made, the specifying information has been included and that the image forming device is the pre-designated image forming device;

an acceptance step of accepting, in response to the operation unit being operated, a printing command for the image specified by the thumbnail displayed on the display unit; and an image forming step of (a) executing a printing command and printing the image on the sheet when the printing command accepted by the acceptance unit is the printing command of the image specified by the thumbnail displayed on the display unit in a state in which security of the contents of the image is not ensured, and (b) not executing the printing command when the printing command accepted by the acceptance step is the printing command of the image specified by the thumbnail displayed on the display unit in a state in which security of the contents of the image is ensured.

* * * * *